US008161263B2

(12) United States Patent
Arimilli et al.

(10) Patent No.: US 8,161,263 B2
(45) Date of Patent: *Apr. 17, 2012

(54) TECHNIQUES FOR INDIRECT DATA PREFETCHING

(75) Inventors: Ravi K. Arimilli, Austin, TX (US); Balaram Sinharoy, Poughkeepsie, NY (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 774 days.

This patent is subject to a terminal disclaimer.

(21) Appl. No.: 12/024,239

(22) Filed: Feb. 1, 2008

(65) Prior Publication Data

US 2009/0198950 A1    Aug. 6, 2009

(51) Int. Cl.
*G06F 13/00* (2006.01)
(52) U.S. Cl. ................. 711/204; 711/E12.004
(58) Field of Classification Search .............. None
See application file for complete search history.

(56) References Cited

U.S. PATENT DOCUMENTS

| 4,944,034 | A | * | 7/1990 | Ohsawa | 345/419 |
| 5,584,005 | A | * | 12/1996 | Miyaoku et al. | 711/206 |
| 6,055,622 | A | * | 4/2000 | Spillinger | 712/207 |
| 6,145,064 | A | * | 11/2000 | Long et al. | 711/158 |
| 6,216,199 | B1 | * | 4/2001 | DeKoning et al. | 711/3 |
| 6,216,214 | B1 | * | 4/2001 | Bryg et al. | 711/207 |
| 6,247,107 | B1 | * | 6/2001 | Christie | 711/216 |
| 6,493,816 | B1 | * | 12/2002 | Munroe et al. | 711/209 |
| 6,571,318 | B1 |  | 5/2003 | Sander et al. |  |
| 6,675,279 | B2 | * | 1/2004 | Arimilli et al. | 711/204 |
| 6,728,839 | B1 | * | 4/2004 | Marshall | 711/137 |
| 2002/0087800 | A1 |  | 7/2002 | Abdallah et al. |  |
| 2003/0074540 | A1 | * | 4/2003 | Arimilli et al. | 711/204 |
| 2004/0123069 | A1 | * | 6/2004 | Franaszek et al. | 711/206 |
| 2005/0154825 | A1 | * | 7/2005 | Fair | 711/113 |
| 2005/0198439 | A1 |  | 9/2005 | Lange et al. |  |
| 2007/0043908 | A1 | * | 2/2007 | Diefendorff | 711/137 |
| 2007/0174555 | A1 |  | 7/2007 | Burtscher et al. |  |
| 2008/0127131 | A1 | * | 5/2008 | Gao et al. | 717/140 |
| 2009/0198905 | A1 |  | 8/2009 | Arimilli et al. |  |
| 2010/0169606 | A1 |  | 7/2010 | Deneau |  |

OTHER PUBLICATIONS

Rossiter, Sean D., Office Action dated Jul. 6, 2010; U.S. Appl. No. 12/024,246.
Rossiter, Sean D., Office Action dated Jun. 22, 2010; U.S. Appl. No. 12/024,248.

(Continued)

*Primary Examiner* — Edward Dudek, Jr.
*Assistant Examiner* — Sean D Rossiter
(74) *Attorney, Agent, or Firm* — Yudell Isidore Ng Russell PLLC

(57) ABSTRACT

A processor includes a first address translation engine, a second address translation engine, and a prefetch engine. The first address translation engine is configured to determine a first memory address of a pointer associated with a data prefetch instruction. The prefetch engine is coupled to the first translation engine and is configured to fetch content, included in a first data block (e.g., a first cache line) of a memory, at the first memory address. The second address translation engine is coupled to the prefetch engine and is configured to determine a second memory address based on the content of the memory at the first memory address. The prefetch engine is also configured to fetch (e.g., from the memory or another memory) a second data block (e.g., a second cache line) that includes data at the second memory address.

18 Claims, 8 Drawing Sheets

OTHER PUBLICATIONS

Rossiter, Sean D., Office Action dated Jun. 16, 2010; U.S. Appl. No. 12/024,260.
Rossiter, Sean D., Office Action dated Jun. 18, 2010; U.S. Appl. No. 12/024,186.
Rossiter, Sean D., Final Office Action dated Dec. 8, 2010; U.S. Appl. No. 12/024,246.
Rossiter, Sean D., Final Office Action dated Dec. 8, 2010; U.S. Appl. No. 12/024,248.
Rossiter, Sean D., Final Office Action dated Nov. 18, 2010; U.S. Appl. No. 12/024,260.
Rossiter, Sean D., Final Office Action dated Dec. 8, 2010; U.S. Appl. No. 12/024,186.
Rossiter, Sean D., Office Action dated Mar. 28, 2011; U.S. Appl. No. 12/024,260.
Rossiter, Sean D., Office Action dated Jul. 27, 2011; U.S. Appl. No. 12/024,246.
Rossiter, Sean D., Notice of Allowance dated Aug. 4, 2011; U.S. Appl. No. 12/024,248.
Rossiter, Sean D., Office Action dated Jul. 1, 2011; U.S. Appl. No. 12/024,260.
Srinivasan et al., 'Branch History Guided Instruction Pre-Fetching', Seventh International Symposium on High Performance Computer Architecture, pp. 291-300, IEEE, 2001.
http://en.wikipedia.org/wiki/Linked_list; 17 pp. (Sep. 16, 2010).
Zhuag, X. et al., "Storage Assignment Optimizations through Variable Coalescence for Embedded Processors"; ACM 1-598113-647-Jan. 3, 2006; LCTES '03, Jun. 11-13, 2003, San Diego, CA; pp. 220-231.
Sudarsanam, A. et al., "Analysis and Evaluation of Address Arithmetic Capabilities in Custom DSP Architectures"; ACM 0-89791-920-3/97/06; 1997; 6 pp.
Atri, S. et al, "Improving Offset Assignment for Embedded Processors"; Dept. Elec. & Comp. Engr., Louisiana State University; 15 pp.
Huynh, J., "Minimizing Address-Computation Overhead"; Fall 2006, Dept. of Computing Science, University of Alberta, Edmonton Alberta, 108 pp.

* cited by examiner ldi RT, RX, RY

| Opcode | RT | RX | RY | Extended Opcode | F |
|---|---|---|---|---|---|
| 0 | 6 | 11 | 16 | 21 | 30 |

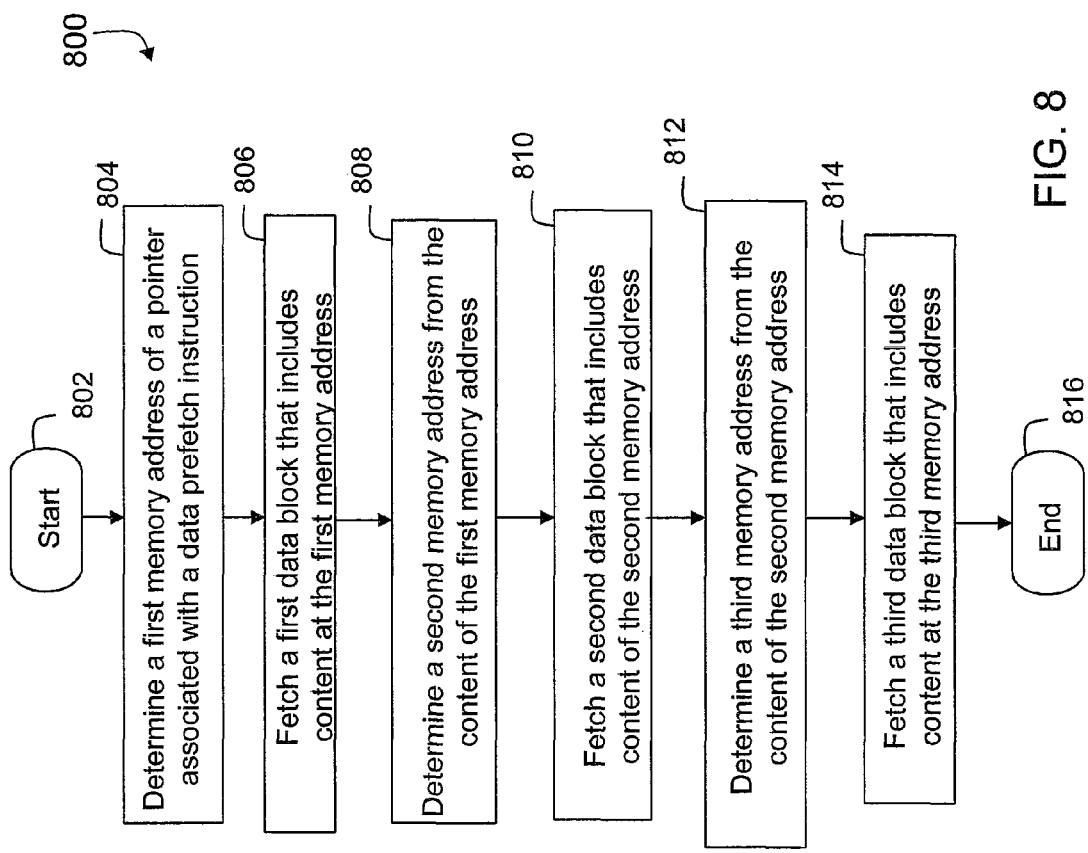

TECHNIQUES FOR INDIRECT DATA PREFETCHING

This invention was made with United States Government support under Agreement No. HR0011-07-9-0002 awarded by DARPA. The Government has certain rights in the invention.

CROSS-REFERENCE TO RELATED APPLICATIONS

The present application is related to the following commonly assigned patent applications: U.S. patent application Ser. No. 12/024,186, entitled "TECHNIQUES FOR DATA PREFETCHING USING INDIRECT ADDRESSING" by Ravi K. Arimilli et al.; U.S. patent application Ser. No. 12/024,246, entitled "TECHNIQUES FOR DATA PREFETCHING USING INDIRECT ADDRESSING WITH OFFSET" by Ravi K. Arimilli et al.; U.S. patent application Ser. No. 12/024,248, entitled "TECHNIQUES FOR PREDICTION-BASED INDIRECT DATA PREFETCHING" by Ravi K. Arimilli et al.; and U.S. patent application Ser. No. 12/024,260, entitled "TECHNIQUES FOR MULTI-LEVEL INDIRECT DATA PREFETCHING" by Ravi K. Arimilli et al., all of which were filed on even data herewith and are incorporated herein by reference in their entirety for all purposes.

BACKGROUND

1. Field

This disclosure relates generally to data prefetching and, more specifically to techniques for indirect data prefetching.

2. Related Art

Data prefetch (cache management) instructions, which have used direct addressing, have been employed to move data into a cache before the data is accessed in an attempt to minimize cache-miss latency. Data prefetch instructions (which may be added to software by a compiler or programmer) are generally treated as hints, which affect software performance but not software functionality. Hints can be used to move data into a given cache level in an attempt to provide a desired performance. Prefetched data in a same cache line as desired data has spatial locality and has a high probability of being accessed in the near future. Data with temporal locality, or persistence, is expected to be accessed multiple times and should generally be maintained in a cache for ready accessibility. Accesses to data with no temporal locality are transient and, as such, data with no temporal locality should generally be removed from a cache after use to provide room in the cache for other data.

Some data prefetch instructions allow for specifying a cache level in which data should be stored. Various data prefetch instructions make a distinction between memory which is expected to be read and memory which is expected to be written. When data is to be written, a data prefetch instruction usually moves a data block into a cache so that an expected store is to the cache. A prefetch for a write generally brings data into a cache in an exclusive or modified state. A prefetch for data to be written can usually be replaced with a prefetch for data to be read (this is usually how implementations that define both kinds of instructions, but do not support prefetch for writes, operate). A data block accessed by a data prefetch instruction usually corresponds to a cache line, whose size is implementation specific. Various architectures implement data prefetch instructions with a base update form, which modifies a prefetch address following a prefetch. Base update (pre/post increment/decrement) is also supported on load and store instructions for some architectures and can be taken into consideration in code that uses data prefetch instructions.

Some architectures implement data prefetch instructions that cause faults when the address to prefetch is invalid or not cacheable. In general, data should be in a cache prior to being accessed. However, using prefetches that are too speculative can have negative affects as there are costs associated with data prefetch instructions. Similarly, prefetching data that is already in the cache increases overhead without providing any benefit. For example, data may already be in a cache when the data is in the same cache line as data already prefetched (spatial locality) or if the data has been used recently (temporal locality). Some architectures recognize data prefetch instructions but treat them as no operation (nop) instructions. Usually, data prefetch instructions are ignored for memory pages that are not cacheable. However, a base address of a data prefetch instruction that has a base update form may be updated even if addressed memory cannot be prefetched.

SUMMARY

According to one aspect of the present disclosure, a processor includes a first address translation engine, a second address translation engine, and a prefetch engine. The first address translation engine is configured to determine a first memory address of a pointer associated with a data prefetch instruction. The prefetch engine is coupled to the first translation engine and is configured to fetch content, included in a first data block (e.g., a first cache line) of a memory, at the first memory address. The second address translation engine is coupled to the prefetch engine and is configured to determine a second memory address based on the content of the memory at the first memory address. The prefetch engine is also configured to fetch (e.g., from the memory or another memory) a second data block (e.g., a second cache line) that includes data at the second memory address. A data prefetch instruction may be indicated by a unique operational code (opcode), a unique extended opcode, or a field (including one or more bits) in an instruction.

According to another aspect of the present disclosure, a technique for performing data prefetching using indirect addressing (indirect data prefetching) includes determining a first memory address of a pointer associated with a data prefetch instruction. A first data block (e.g., a first cache line) that includes multiple elements (one of which includes content of a memory at the first memory address) is then fetched. Respective second memory addresses are determined for at least two of the multiple elements. Respective second data blocks (e.g., respective second cache lines) for each of the respective second memory addresses are then fetched (e.g., from the memory or another memory).

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 2 is a diagram of an example data prefetch instruction that may be employed in the processor system of FIG. 1, according to various embodiments of the present disclosure.

FIG. 8 is a flowchart of an example process for performing multi-level indirect data prefetching according to an aspect of the present disclosure.

DETAILED DESCRIPTION

Figure 1:
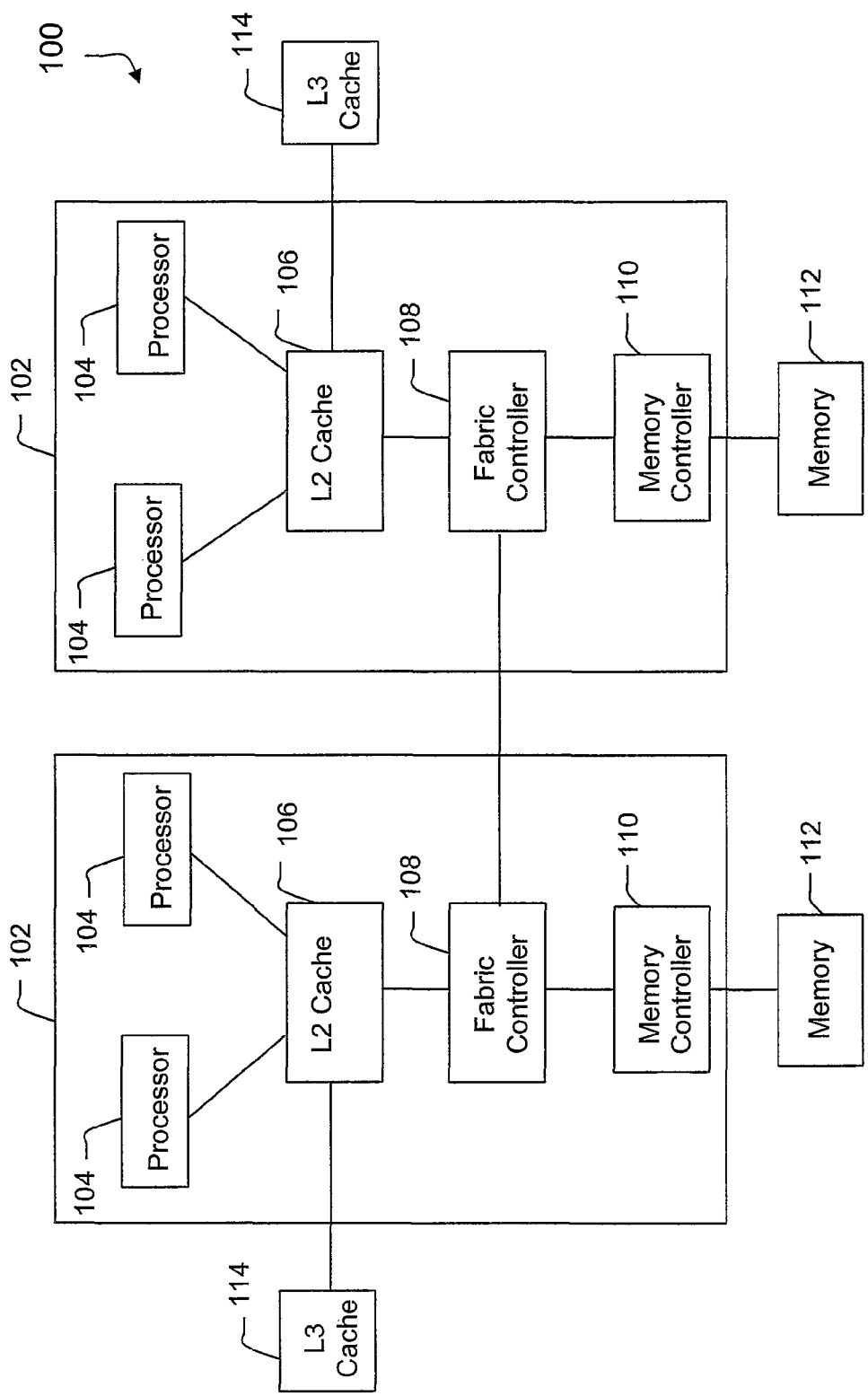
FIG. 1 is a diagram of an example processor system that may be configured according to various aspects of the present disclosure.

As will be appreciated by one of ordinary skill in the art, the present invention may be embodied as a method, system, device, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium would include the following: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein the term "coupled" includes a direct electrical connection between elements or blocks and an indirect electrical connection between elements or blocks achieved using one or more intervening elements or blocks.

Traditionally, data prefetch instructions have employed direct addressing. Unfortunately, for many high performance computing (HPC) applications (e.g., computational fluid dynamics and building and testing virtual prototypes), employing direct addressing for data prefetch instructions may not provide a desired performance level. For example, as programmers gravitate to employing higher-level languages (e.g., Java and X10) data addressing is increasingly utilizing object-oriented mechanisms that frequently implement indirect addressing. In this case, prefetch engines of conventional processors stall when referenced data is based on prefetched data (i.e., when indirect addressing is employed).

According to one or more aspects of the present disclosure, instruction set architecture (ISA) support for data prefetching using indirect addressing is implemented by employing a data prefetch instruction (e.g., a load instruction) whose return data is a pointer to data of interest. In general, programs are written using effective addresses (EAs), while caches and main memory are accessed utilizing real addresses (RAs). As such, address translation is required to convert the EAs (used by software) to RAs (used by hardware). For example, in various PowerPC™ architectures a segment table (located in a segment lookaside buffer (SLB)) and hashed page table (located in a translation lookaside buffer (TLB)) have been employed to translate EAs (used by software) into RAs (used by hardware) to locate data in storage. After translation, an EA and RA pair may be stored in an effective-to-real address translation (ERAT) buffer to reduce latency associated with accessing data in storage. In general, an ERAT table (stored in the ERAT buffer) may be accessed (indexed) using an EA associated with a data prefetch instruction. It should be appreciated that the techniques disclosed herein are equally applicable to architectures that convert an EA to an RA without first converting the EA to a virtual address (VA).

With reference to FIG. 1, an example processor system 100 is illustrated that may employ data prefetching using indirect addressing according to one or more of the techniques disclosed herein. The example processor system 100 includes two chip-level multiprocessors (CMPs) 102, each of which includes two processors 104. The processors 104 may, for example, operate in a simultaneous multithreading (SMT) mode or a single thread (ST) mode. When the processors 104 are operating in the SMT mode, the processors 104 may employ multiple separate instruction fetch address registers to store program counters for multiple threads. In at least one embodiment, the processors 104 each include a first level (L1) cache memory (not separately shown) that is coupled to a shared second level (L2) cache memory (cache) 106, which is coupled to a shared third level (L3) cache 114 and a fabric controller 108. As is illustrated, the fabric controller 108 is coupled to a memory controller 110, which is coupled to a memory subsystem 112. The memory subsystem 112 includes an application appropriate amount of volatile and non-volatile memory. The fabric controller 108 facilitates communication between different ones of the CMPs 102 and between the processors 104 and the memory subsystem 112 and in this manner functions as an interface.

According to various aspects of the present disclosure, a data prefetch instruction (e.g., an enhanced load instruction) is provided that indicates that return data is a pointer to desired data of interest (or a pointer to a pointer to desired data of interest, etc.). In this case, the data prefetch instruction can be configured to include a field (including one or more bits) that indicates that return data at a specified address is a pointer to desired data, as well as indicating a number of indirect addressing levels employed). Alternatively, an opcode or extended opcode may be employed to indicate that an instruction is an indirect data prefetch instruction, as well as a number of indirect addressing levels. In one or more embodiments, a load store unit (LSU) of a processor is configured to first fetch a pointer (e.g., a four byte or eight byte pointer) from a real address (RA) associated with an effective address (EA) specified in an indirect data prefetch instruction (e.g., an indirect load instruction or an indirect store instruction). In one or more embodiments, after fetching the pointer, the LSU treats the pointer (return data) as an EA. The EA is then translated by the LSU to determine an RA (associated with a lower level cache and/or main memory) from which to fetch desired data.

For example, with reference to FIG. 2, when an indirect load instruction (ldi RT, RX, RY) 200 is executed, the LSU first calculates a pointer location (PL) by adding content of register 'X' and register 'Y' (i.e., PL=RX+RY) to determine an EA of the pointer, which is stored in the register 'T'. The LSU then translates the EA of the PL to an associated RA and fetches content (at the RA) from a lower level cache or main memory. In this case, the LSU treats the fetched data as a second EA for a desired data location (DL). In this embodiment, the LSU then translates the second EA to a second RA and then sends the second RA to a lower level cache or main memory to fetch desired data (in an associated data block) for transfer to a data cache (e.g., a level 1 (L1) cache, a level 2 (L2) cache, or level 3 (L3) cache). In the above example, RT, RX, and RY are register file addresses (e.g., in various PowerPC™ implementations, RT, RX, and RY can range from 0 to 31, but in other processors the range can be higher or lower). Instead of providing the registers RX and RY to calculate the first address, the first address may be provided in various other manners (e.g., directly through an absolute addressing mechanism or through indexing).

Figure 3:
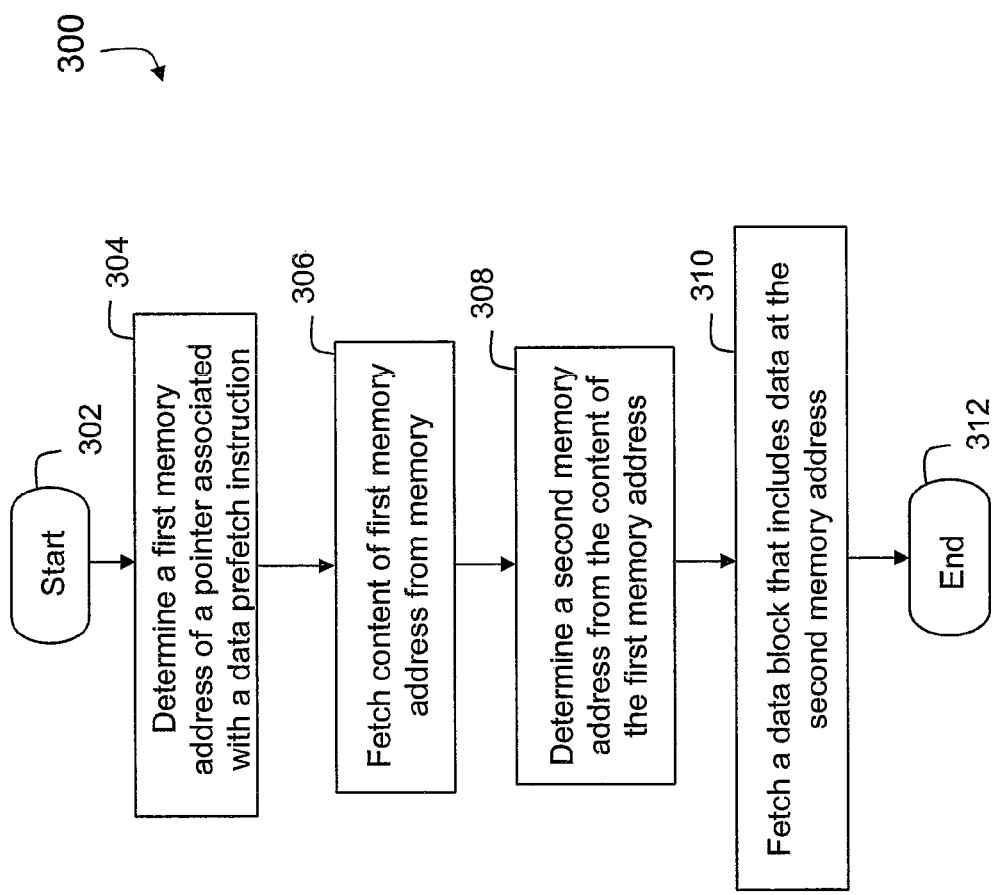
FIG. 3 is a flowchart of an example process for performing data prefetching using indirect addressing (indirect data prefetching), according to one aspect of the present disclosure.

With reference to FIG. 3, a flowchart of an example process 300 for performing data prefetching using indirect addressing (indirect data prefetching) according to an embodiment of the present disclosure is illustrated. In block 302 the process 300 is initiated, at which point control transfers to block 304. In block 304, a first memory address of a pointer associated with a data prefetch instruction is determined. In one implementation, determining the first memory address includes calculating a first EA of the pointer, translating the first EA to a first VA (e.g., using an SLB), and translating the first VA to a first RA (e.g., using a TLB) that corresponds to the first memory address. In another implementation, determining the first memory address includes calculating a first EA of the pointer and translating the first EA to a first RA (e.g., using an ERAT or other mechanism) that corresponds to the first memory address.

Next, in block 306, content of a memory at the first memory address is fetched. The memory may be a lower level cache (e.g., a second level (L2) cache, a third level (L3) cache, etc.) or main memory. Then, in block 308, a second memory address is determined from the content of the memory at the first memory address. In one implementation, determining the second memory address includes calculating a second EA of the content of the memory at the first memory address, translating the second EA to a second VA, and translating the second VA to a second RA that corresponds to the second memory address. In another implementation, determining the second memory address includes calculating a first EA of the content of the memory at the first memory address and translating the first EA to a first RA that corresponds to the first memory address. Next, in block 310, a data block (e.g., a cache line) including data at the second memory address is fetched for inclusion in a cache (which may be a first level (L1) cache, an L2 cache, an L3 cache, etc. that functions as a data cache or a shared (data and instruction) cache). Following block 310 control transfers to block 312 where the process 300 terminates.

According to another aspect of the present disclosure, one or more address translation engines are implemented within a processor chip to calculate indirect addresses. For example, a translation engine may execute microcode to calculate a target of an indirect access. For indirect address prefetching for A[B[I]+O], as seen by a program (e.g., a Fortran or C program), an LSU may be configured to prefetch a data block (e.g., a cache line) containing B[I] and store the data block in a data (or shared) cache (or a separate scratch register). Assuming a data block corresponds to a cache line and each cache line contains one-hundred twenty-eight bytes and 64-bit addressing is employed, each address requires eight bytes. In a typical embodiment, B[I] may be a 32-bit or a 64-bit index added to an offset "O" that is a 64-bit address. Depending on whether B[I] elements are four bytes or eight bytes, there are thirty-two or sixteen elements in a fetched cache line that includes B[I], respectively. In one or more embodiments, an LSU is configured to include logic (e.g., a state machine) that walks through the elements in the cache line and computes B[I]+O to determine EAs for A[B[I]+O]. In this case, the LSU performs address translations to determine the RAs, which are sent to a lower level cache or main memory to prefetch data cache lines to a data (or shared) cache. In this manner, successive loads to A[B[I]+O] are usually cache-hits and, in this case, cache-miss penalties are avoided.

Figure 4:
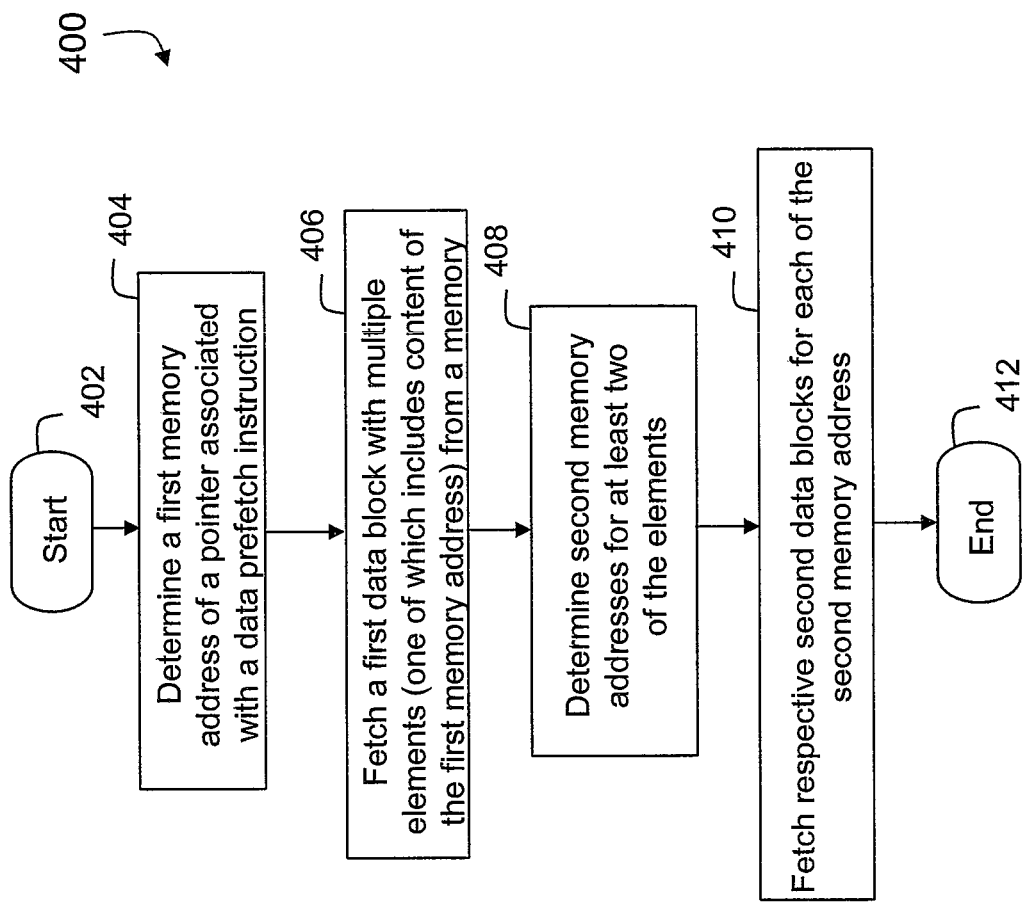
FIG. 4 is a flowchart of an example process for performing indirect data prefetching for multiple elements of a data block, according to another aspect of the present disclosure.

With reference to FIG. 4, an example process 400 is illustrated that performs indirect data prefetching according to another aspect of the present disclosure. The process 400 is initiated in block 402, at which point control transfers to block 404. In block 404, a first memory address of a pointer associated with a data prefetch instruction is determined. Next, in block 406, a first data block (e.g., a first cache line) including multiple elements (one of which includes content of a memory at the first memory address) is fetched. Then, in block 408, respective second memory addresses are determined for at least two of the multiple elements. The second memory addresses may, or may not, include an offset. Depending on where the process 400 is implemented (LSU or memory controller), when an offset is included, the offset may be added to an EA prior to translation to an RA (LSU) or the offset may be added to an RA after translation (cache or memory controller), assuming a page boundary is not crossed. Next, in block 410, respective second data blocks (respective second cache lines) for each of the respective second memory addresses are fetched from the memory according to an implemented process. Following block 410, control transfers to block 412, where the process 400 terminates.

As is described herein, for data prefetching using indirect addressing, address translation is performed at least twice. For example, in one embodiment, an address translation engine first determines a first RA from a first EA, which is RX+RY in the above-example. Once returned data associated with the first RA is received at the LSU, the LSU translates the returned data (a new EA) to a new RA. To improve efficiency and provide higher translation bandwidth, an LSU may be configured to include two or more address translation engines. In this case, a second address translation engine may be coupled to an additional port of a segment lookaside buffer (SLB) and an additional port of a translation lookaside buffer (TLB). The second address translation engine may also be coupled to an additional port of a data effective-to-real address translation (D-ERAT) buffer, which summarizes tables in the SLB and the TLB buffers. The additional ports allow a new EA to be translated by the second address translation engine, while a first address translation engine is available to translate other indirect data prefetching instructions (e.g., load/store instructions).

Figure 5:
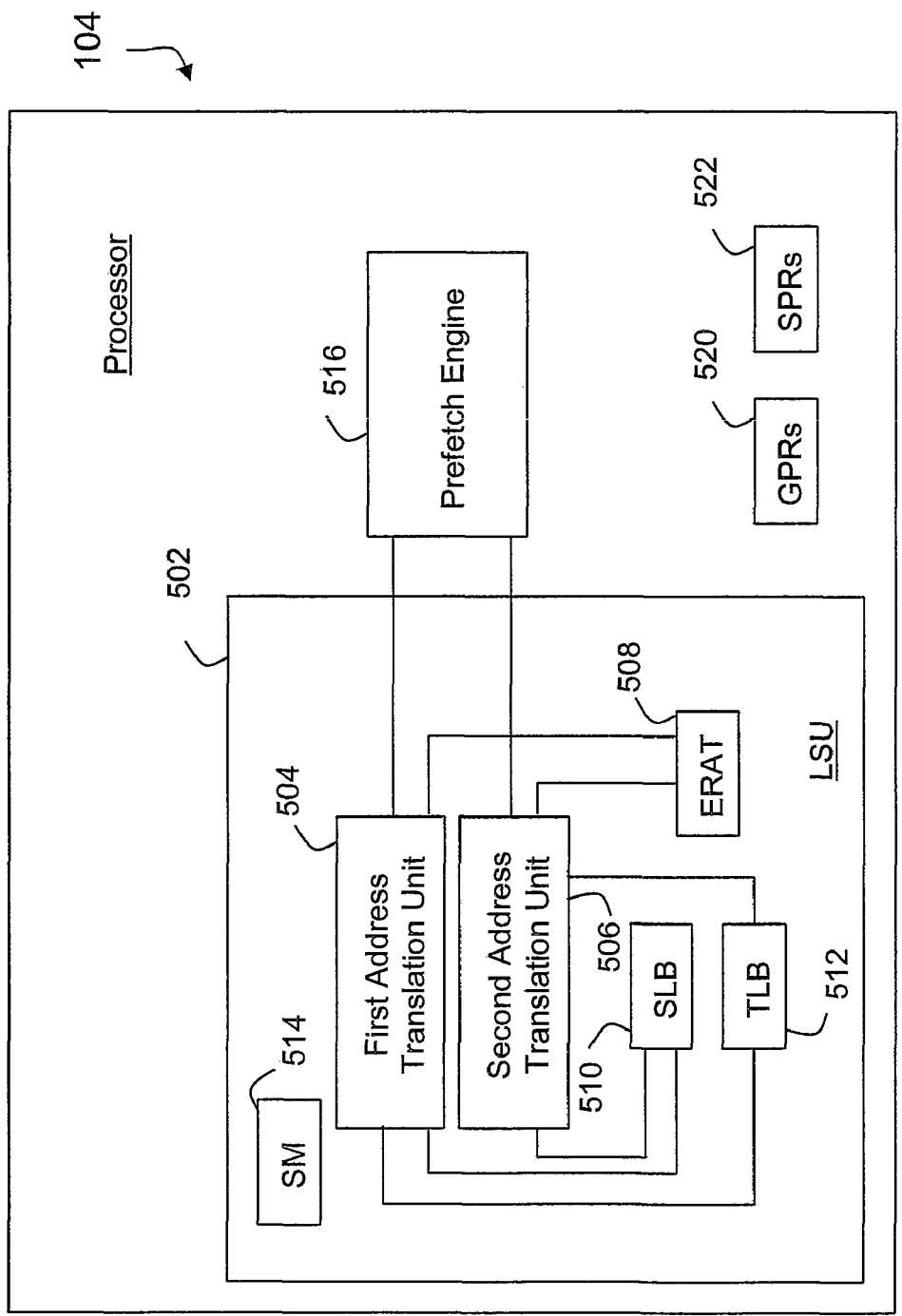
FIG. 5 is a diagram of a relevant portion of a processor that includes a prefetch engine and an example load store unit (LSU) configured according to one aspect of the present disclosure.

With reference to FIG. 5, a relevant portion of the processor 104 is shown as including an LSU 502 that includes a first address translation unit 504 and a second translation unit 506 each of which are coupled to a prefetch engine 516. A state machine (SM) 514, as noted above, is included to walk through elements in a cache line to compute B[I]+O for each element in the cache line to determine EAs when an offset is employed. The unit 504 is coupled to a first port of SLB 510, a first port of TLB 512, and a first port of ERAT 508. Similarly, the unit 506 is coupled to a second port of the SLB 510, a second port of the TLB 512, and a second port of the ERAT 508. In this configuration, the units 504 and 506 can simultaneously access the SLB 510 and the TLB 512 or the ERAT 508 and, in this manner, perform two address translations simultaneously.

According to another aspect of the present disclosure, a prefetch unit is configured to support indirect addressing with register offset. In this embodiment, the prefetch unit calculates a target address utilizing an offset included in a general purpose register (GPR) or other processor register. In this case, desired data to be fetched through indirect data prefetching is not at the PL, but is at an offset from the PL. The offset can be specified in various manners in a programming environment. For example, the offset can be specified through a special purpose register (SPR) in a processor core, caches, or memory. As other examples, the offset can be specified as a new address field in the prefetch instruction or as a new register field in a prefetch instruction. As another example, the offset can be specified in a particular GPR location, as indicated by an opcode field of the instruction (e.g., a new data prefetch instruction opcode may specify that content of GPR0 should be treated as offset "O" to compute A[B[I]+O].

In a typical implementation, an LSU handles the offset for the following cases: when the offset is specified in the instruction (either through a new register field or a new address field); when the offset is specified in a particular GPR as indicated by the instruction opcode; and when the offset is specified by an SPR, which is maintained by the processor core. If the LSU handles the offset, then the LSU adds the offset to the PL before performing the EA to RA translation. After adding the offset, the LSU performs the EA to RA translation and then brings the prefetch data to a target processor register. When a memory subsystem is configured to handle an offset, the offset may be specified by an SPR that is maintained by a cache controller or memory controller. In this case, the cache or memory controller adds the offset to the RA following the EA to RA translation and before desired data is accessed from a lower level cache or main memory.

According to another aspect of the present disclosure, a prefetch engine is configured to include logic to detect indirect data prefetch streams (based upon access history) and prefetch targets of subsequent accesses in a memory access stream. In this case, a programmer is not required to employ hints to specify indirect prefetching addresses and offsets. As such, configuring a processor to detect indirect prefetching streams, while increasing hardware complexity, generally simplifies programming. Moreover, when a programmer attempts to specify indirect data prefetch streams and misses one or more of the streams, a prefetch engine configured to detect a stream of indirect address accesses to memory detects the missed indirect data prefetching streams. As employing data prefetch instructions in a program only enhances performance, a program runs, with or without performance hints provided by a programmer (however, if the programmer does not provide indirect prefetch hints or provides wrong information the program may ran slower). A hardware prefetch mechanism that supports indirect addressing may be maintained in one or more prefetch tables in a prefetch engine in a processor core.

For indirect prefetching, such as A[B[I]] or A[B[I]+O] (where 'O' is a fixed offset), a prefetch engine attempts to capture successive values of B[I] for all references coming from an array A[ ] and attempts to anticipate a value of B[I] for a next value of "I" (how much the index "I" is incremented from one iteration to the next depends on the program). A first address of the array A[ ] may be hashed with an address of B[I] to generate an index into the prefetch table. The hashing may employ bit-wise exclusive OR (XOR) or another hashing scheme. In this case, for the same array A and B, for every new I there is a new B[I] and a new entry in a prefetch table of the prefetch engine.

For every new load reference to location A[B[I]], the prefetch table may be accessed, based on the indexing mechanism mentioned above. In a typical implementation, before actual execution of a data prefetch (e.g., a load) operation, the prefetch table is walked through to find successive addresses of A[B[I]]. At the time of execution of the data prefetch instruction (e.g., a load instruction), if the EA in the indexed entry is found to be different from what was calculated at the time of prediction for the data prefetch address, the prefetch table entry is updated (this typically happens when the address is seen for the first time and the prefetch table is not yet initialized). The prefetch table can also be maintained in a cache controller or main memory controller. In the case where the prefetch table is maintained in a cache or main memory controller, the prefetch table looses its effectiveness to some extent, as a prefetch stream is terminated at a page boundary.

Figure 6:
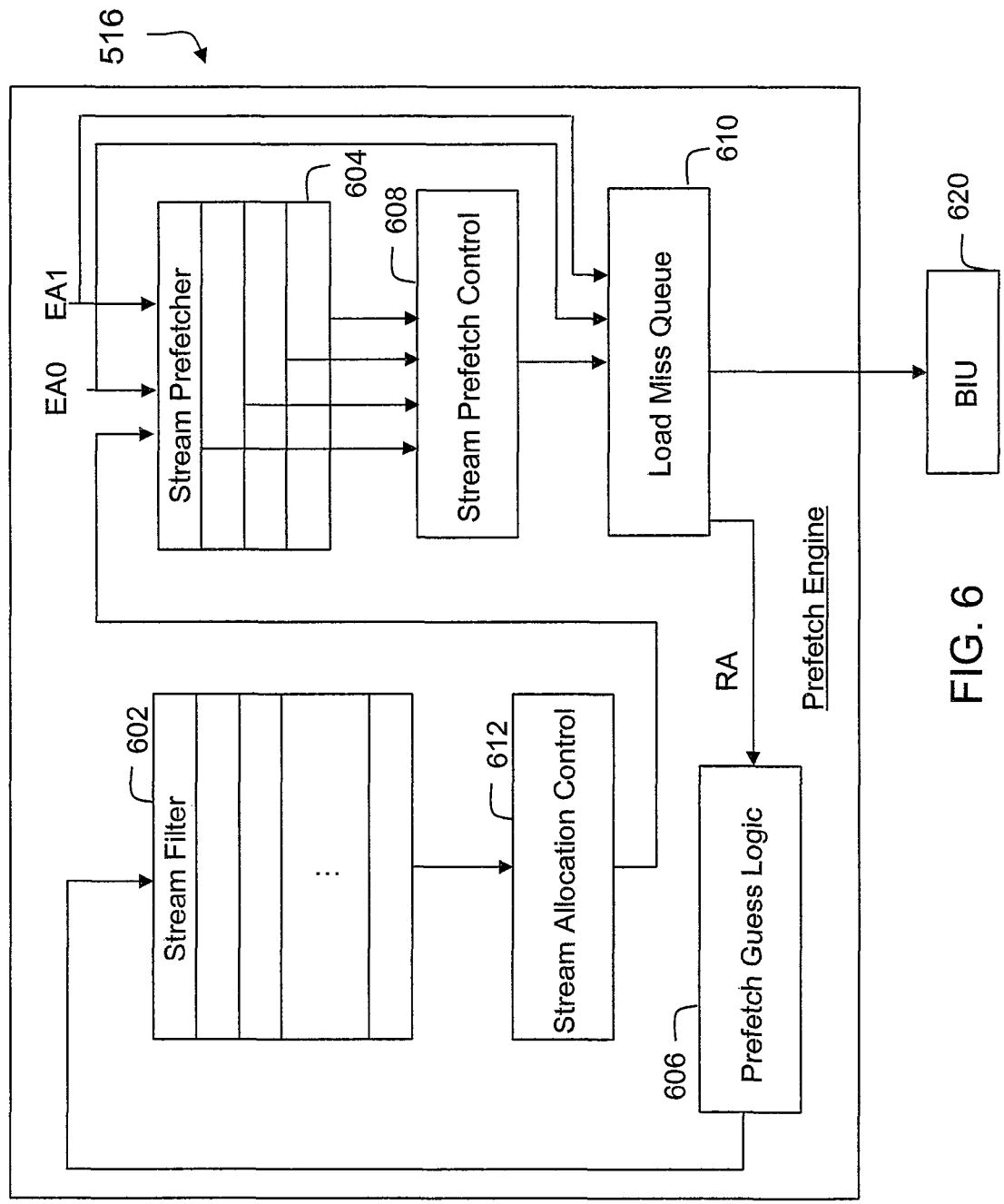
FIG. 6 is a diagram of a relevant portion of an example prefetch engine, such as the prefetch engine of FIG. 5.

With reference to FIG. 6, a prefetch engine 516 (that prefetches data by monitoring data cache-line misses and predicting patterns) is illustrated. When a stream pattern is detected, the prefetch engine 516 speculatively prefetches cache lines in anticipation of their use. In one embodiment, the prefetch engine 516 includes a stream filter (e.g., a ten-entry first-in first-out (FIFO) buffer) 602 and a stream prefetcher (including a prefetch table) 604. Prefetch guess logic 606 observes data cache line misses (provided by load miss queue 610), in the form of real addresses (RA), to detect potential streams to prefetch. The stream filter 602 records data cache-line miss information provided by the logic 606. The logic 606 increments or decrements an RA of a cache line (e.g., depending on an offset within a cache line) and the "guess" is placed in the stream filter 602.

As new cache misses occur, if the RA of a new cache miss matches one of the guessed addresses in the stream filter 602, a stream has been detected. If a stream prefetch control 608 has fewer than a predetermined number of (e.g., four) streams active, a new stream is installed in the stream filter 602 and a prefetch to a cache line anticipated next in the stream is sent out to memory via a bus interface unit (BIU) 620. Once placed in a stream prefetcher 604, a stream usually remains active until it is aged out. For example, a stream may be aged out when the stream reaches its end and other cache misses displace the stream entry in the stream filter 602. When a stream is prefetched, the prefetcher 604 attempts to stay ahead of a current cache line (i.e., the cache line whose elements are currently being accessed by a data prefetch instruction). For example, a next cache line that follows the current cache line may be prefetched into an L1 cache, and a cache line that follows the next cache line may be prefetched to a prefetch buffer in the BIU 620.

The prefetch engine 516 may be configured to concurrently prefetch multiple streams, each of which may be one or more cache lines ahead of a current cache line. The prefetch engine 516 monitors data prefetch (e.g., load) addresses (e.g., EA0 and EA1) from an LSU. According to one embodiment, when the LSU finishes with a current cache line and advances to a next cache line (which is already in the L1 cache due to prefetching), the prefetch engine 516 transfers the cache line in the prefetch buffer (in the BIU 620) to the L1 cache and prefetches the next cache line into the prefetch buffer (in the BIU 620). In this way, prefetching of lines may be paced by a rate at which elements in a stream are consumed.

Figure 7:
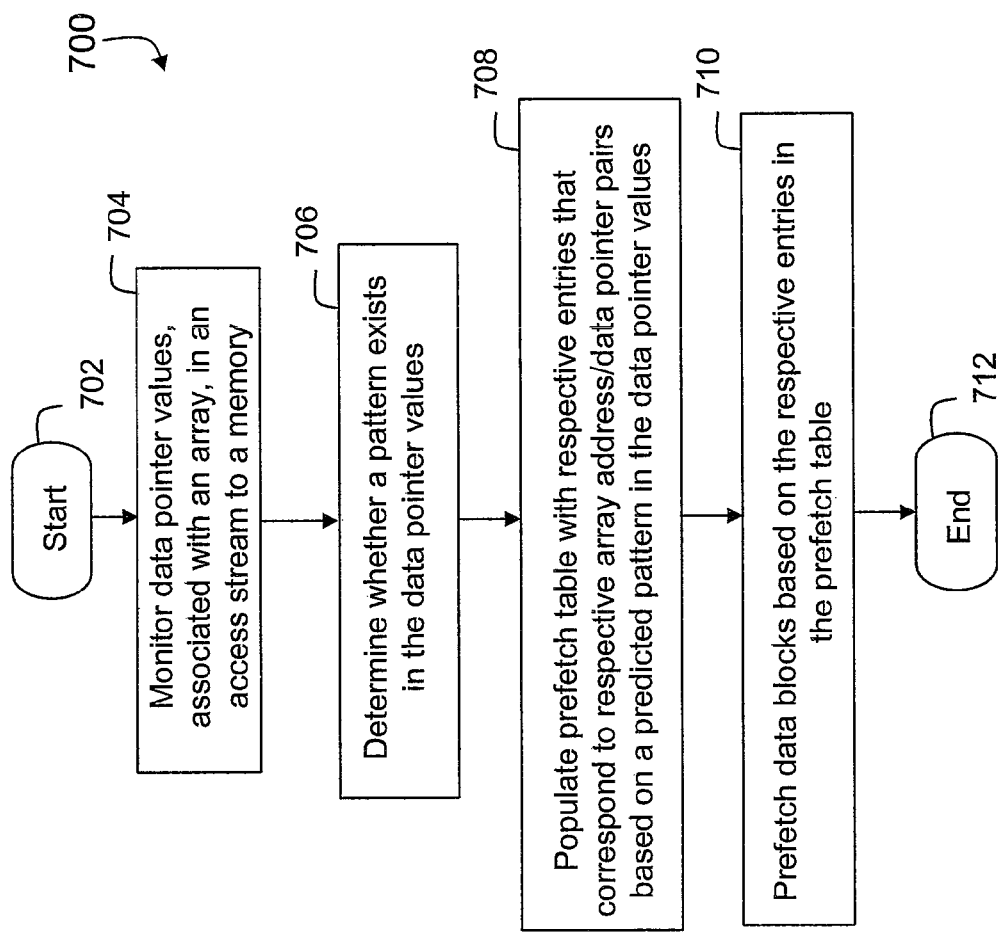
FIG. 7 is a flowchart of an example process for performing data prefetching by monitoring data pointer values, associated with an array, in an access stream to a memory, according to one aspect of the present disclosure.

With reference to FIG. 7, a process 700 for performing indirect data prefetching, according to an embodiment of the present disclosure, is illustrated. In block 702 the process 700 is initiated, at which point control transfers to block 704. In block 704, data pointer values, associated with an array, are monitored in an access stream associated with a memory. Next, in block 706, it is determined whether a pattern exists in the data pointer values. Then, in block 708, a prefetch table is populated with respective entries that correspond to respective array address/data pointer pairs based on a predicted pattern in the data pointer values. Next, in block 710, respective cache lines are prefetched from the memory based on the respective entries in the prefetch table. For example, a first array address may be hashed with a first data pointer address associated with the first array to generate a first index into the prefetch table. In this manner, a first cache line (whose address is associated with the first data pointer address in the prefetch table) may be prefetched. The respective array address/data pointer pairs may be, for example, RAs or EAs. Following block 710, control then transfers to block 712 where the process 700 terminates.

According to another aspect of the present disclosure, a prefetch unit is configured to include logic that performs multi-level prefetching of targets identified via indirect addressing. Two-level indirection without an offset can be represented as A[B[C[I]] and three-level indirection without an offset can be represented as A[B[C[D[I]]]]. In each level, an offset can also be added. For example, for two-level indirection with an offset can be represented as A[B[C[I]+O1]+O2], where O1 and O2 are two different offsets, which may have the same value. In one or more embodiments, multiple special purpose registers (SPRs) are maintained for each of the multiple offsets. For two-level indirection, an LSU first does the one-level indirection for B[C[I]+O1]. In this case, the LSU creates a first pointer location (PL1), then adds the offset O1 to the PL1 to provide a first EA and then translates the first EA to a first RA and fetches the data at the first RA. Instead of treating the fetched data as the desired data, the LSU treats the fetched data as a second EA for a second pointer location (PL2). The LSU then computes an EA of A[PL2+O2] to get the final data. In this case, the LSU calculates the EA of A[PL2+O2], translates the EA to a second RA, fetches a cache line of data that includes the second RA, and places the fetched cache line in a data or shared cache.

With reference to FIG. 8, a process 800 for performing multi-level indirect data prefetching, according to an embodiment of the present disclosure, is illustrated. In block 802 the process 800 is initiated, at which point control transfers to block 804. In block 804, a first memory address of a pointer associated with a data prefetch instruction is determined. Next, in block 806, a first data block that includes content at the first memory address is fetched. Then, in block 808, a second memory address is determined from the content of the first memory address. Next, in block 810, a second data block that includes content at the second memory address is fetched. Then, in block 812, a third memory address is determined from content of the second memory address. Next, in block 814, a third data block that includes data at the third memory address is fetched. It should be appreciated that additional levels of indirection may be employed. Following block 814, control then transfers to block 816 where the process 800 terminates.

Accordingly, various techniques have been disclosed herein that readily facilitate implementation of data prefetching using indirect addressing in a processor (e.g., an in-order or out-of-order processor).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A processor, comprising:
  a first address translation engine configured to determine a first memory address of a pointer associated with a data prefetch instruction, wherein the first memory address corresponds to an address to which the pointer points;
  a prefetch engine coupled to the first address translation engine, wherein the prefetch engine is configured to fetch a first data block that includes content of a memory at the first memory address; and
  a second address translation engine coupled to the prefetch engine, wherein the second address translation engine is configured to determine a second memory address based solely on the content of the memory at the first memory address, and wherein the prefetch engine is also configured to fetch a second data block that includes desired data at the second memory address, where the data prefetch instruction includes an indirect address field that identifies whether an effective address associated with the data prefetch instruction is a pointer for the desired data that is to be prefetched or whether the effective address corresponds to an address for the desired data.

2. The processor of claim 1, wherein the first address translation engine is further configured to:
   determine a first effective address of the pointer;
   translate the first effective address to a first virtual address; and
   translate the first virtual address to a first real address that corresponds to the first memory address.

3. The processor of claim 2, wherein the second address translation engine is further configured to:
   determine a second effective address of the content of the memory at the first memory address;
   translate the second effective address to a second virtual address; and
   translate the second virtual address to a second real address that corresponds to the second memory address.

4. The processor of claim 1, wherein the first address translation engine is further configured to:
   determine a first effective address of the pointer; and
   translate the first effective address to a first real address that corresponds to the first memory address.

5. The processor of claim 4, wherein the second address translation engine is further configured to:
   determine a second effective address of the content of the memory at the first memory address; and
   translate the second effective address to a second real address that corresponds to the second memory address.

6. The processor of claim 1, wherein the first address translation engine is configured to:
   access, based on a first effective address, a translation table via a first port of an effective-to-real address translation buffer; and
   retrieve, based on the first effective address, the first memory address from the translation table, wherein the first memory address is a first real address.

7. The processor of claim 6, wherein the second address translation engine is configured to:
   access, based on a second effective address, the translation table via a second port of the effective-to-real address translation buffer; and
   retrieve, based on the second effective address, the second memory address from the translation table, wherein the second memory address is a second real address.

8. The processor of claim 1, wherein the first address translation engine is further configured to:
   access, based on a first effective address, a segment table via a first port of a segment lookaside buffer;
   retrieve, based on the first effective address, a first virtual address from the segment table;
   access, based on the first virtual address, a hashed page table via a first port of a translation lookaside buffer; and
   retrieve, based on the first virtual address, the first memory address from the hashed page table, wherein the first memory address is a first real address.

9. The processor of claim 8, wherein the second address translation engine is further configured to:
   access, based on a second effective address, the segment table via a second port of the segment lookaside buffer;
   retrieve, based on the second effective address, a second virtual address from the segment table;
   access, based on the second virtual address, the hashed page table via a second port of the translation lookaside buffer; and
   retrieve, based on the second virtual address, the second memory address from the hashed page table, wherein the second memory address is a second real address.

10. A method of performing indirect data prefetching, comprising:
    determining a first memory address of a pointer associated with a data prefetch instruction, wherein the first memory address corresponds to an address to which the pointer points;
    fetching a first data block including multiple elements one of which includes content of a memory at the first memory address;
    determining respective second memory addresses for at least two of the multiple elements based solely on content of the memory at the at least two of the multiple elements; and
    fetching respective second data blocks at each of the respective second memory addresses, wherein the data prefetch instruction includes an indirect address field that identifies whether an effective address associated with the data prefetch instruction is a pointer for desired data that is to be prefetched or whether the effective address corresponds to an address for the desired data.

11. The method of claim 10, further comprising:
    adding, prior to fetching the respective second data blocks, an offset to each of the multiple elements to provide the respective second memory addresses.

12. The method of claim 10, wherein the determining a first memory address further comprises:
    determining a first effective address of the pointer;
    translating the first effective address to a first virtual address; and
    translating the first virtual address to a first real address that corresponds to the first memory address.

13. The method of claim 12, wherein the determining respective second memory addresses further comprises:
    determining respective second effective addresses based on content of each of the multiple elements;
    translating the respective second effective addresses to respective second virtual addresses; and
    translating the respective second virtual addresses to respective second real addresses that each correspond to one of the respective second memory addresses.

14. The method of claim 10, wherein the determining a first memory address further comprises:
    determining a first effective address of the pointer; and
    translating the first effective address to a first real address that corresponds to the first memory address.

15. The method of claim 14, wherein the determining respective second memory addresses further comprises:
    determining respective second effective addresses based on content of each of the multiple elements; and
    translating the respective second effective addresses to respective second real addresses that each correspond to one of the respective second memory addresses.

16. The method of claim 10, wherein the determining the first memory address includes:
    accessing, based on an effective address, a translation table in an effective-to-real address translation buffer; and
    retrieving, based on the effective address, the first memory address from the translation table, wherein the first memory address is a real address.

17. The method of claim 10, wherein the determining the first memory address includes:

accessing, based on an effective address, a segment table in a segment lookaside buffer;

retrieving, based on the effective address, a virtual address from the segment table;

accessing, based on the virtual address, a hashed page table in a translation lookaside buffer; and retrieving, based on the virtual address, the first memory address from the hashed page table, wherein the first memory address is a real address.

18. A method for performing indirect data prefetching, comprising:

determining, using a first address translation engine, a first memory address of a pointer associated with a data prefetch instruction, wherein the first memory address corresponds to an address to which the pointer points;

fetching a first data block that includes content of a memory at the first memory address;

determining, using a second address translation engine, a second memory address based solely on the content of the memory at the first memory address; and fetching a second data block that includes desired data at the second memory address, wherein the data prefetch instruction includes an indirect address field that identifies whether an effective address associated with the data prefetch instruction is a pointer for the desired data that is to be prefetched or whether the effective address corresponds to an address for the desired data.

* * * * *